A. A. BOWSER.
SEPARATOR.
APPLICATION FILED SEPT. 1, 1909.
1,107,485.
Patented Aug. 18, 1914.
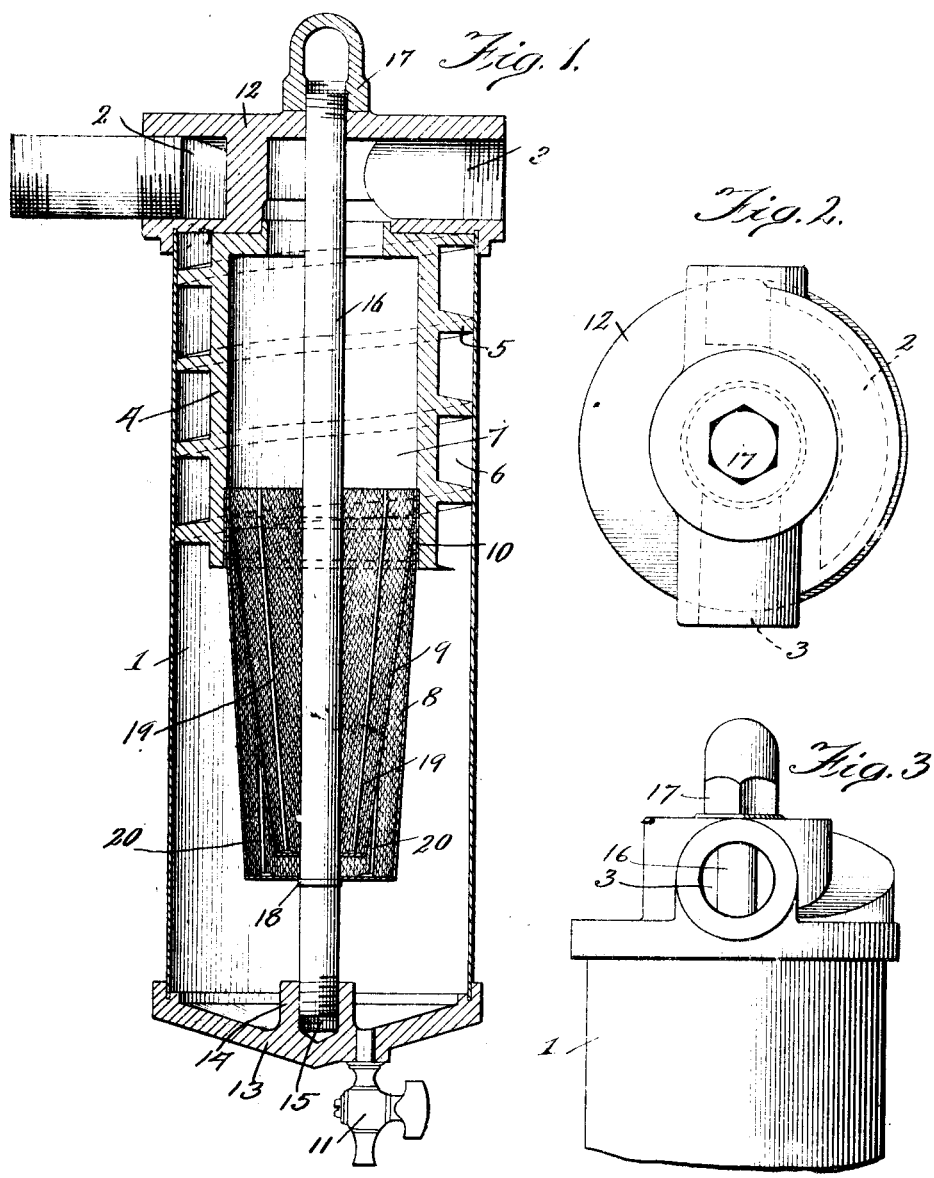

UNITED STATES PATENT OFFICE.

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

SEPARATOR.

1,107,485. Specification of Letters Patent. Patented Aug. 18, 1914.

Application filed September 1, 1909. Serial No. 515,567.

*To all whom it may concern:*

Be it known that I, ALLEN A. BOWSER, a citizen of the United States, residing at Fort Wayne, in the county of Allen and State of Indiana, have invented certain new and useful Improvements in Separators, of which the following is a specification.

This invention relates to separators, and has for its primary object to provide an improved construction, combination and arrangement of parts for effecting the separation of the ingredients of a mixture in a rapid and effective manner.

More especially, the object of this invention is to provide improved means for separating gasolene from water.

Another object of this invention is to provide a gasolene separator of improved construction adapting it for direct connection with a nozzle.

With these and other objects in view to be specifically pointed out in the specification and appended claims, my invention consists of the parts exemplified in the accompanying drawings, in which—

Figure 1 is a longitudinal section of the embodiment shown in the drawings. Fig. 2 is a top plan view of the same. Fig. 3 is a side elevation of the top of the device looking toward the outlet opening.

Referring more particularly to the drawings, the exemplification shown therein comprises, among other constructional features to be hereinafter pointed out, a separator vessel or chamber 1 provided with inlet and outlet openings or ports 2, 3. In order to provide means for introducing a mixture into the separator with a whirling movement, an inlet channel or passage has been provided extending around the inner wall of the chamber 1. Preferably this inlet channel is provided by means of a partition wall 4 arranged adjacent the inner wall of the chamber 1 and extending a portion of the length thereof. In order to facilitate the production and maintenance of a whirling movement of the mixture within the separator chamber, the partition 4 is provided with a helical partition 5 which forms a helical channel or passage 6 extending along the inner wall of the chamber 1, so that the energy in the entering current is kept concentrated within small limits until it reaches a point approximately at the longitudinal center of the separator. The purpose of this construction is, in this preferred exemplification of my invention, to secure a whirling movement which shall be strongest in and around the opening into the discharge channel or passage 7, so that as the mixture passes downwardly through the chamber 1, the centrifugal action of the whirling fluid will impel the heavier ingredients outwardly against the cylindrical wall of the chamber 1 and leave the lighter portions only to be subjected to the filter action of the strainer or filter now to be referred to. In the present exemplification, said filter preferably consists of a strainer or screen 8 secured to the lower end of the partition 4 and extending around adjacent to the wall of said chamber 1. Within the screen 8 and spaced therefrom is a second screen 9 which is also secured to the partition 4 in any suitable manner but preferably by means of a metallic band 10 which is seated in a recess within the inner wall of the partition 4, said band being rigidly fastened to the screens 8 and 9 respectively. In order to make the filtering action of said screens most effective, the outer screen 8 is made of comparatively coarse mesh which excludes any coarse particles which may be in the fluid and at the same time permits the passage of gasolene through the mesh more readily than water, while the inner screen is made of comparatively fine mesh, which permits the passage of gasolene while excluding the passage of water therethrough. The screens are thus co-axially arranged with the axis of the cylinder 1 and while depending from the lower end of the cylinder 4, effectually close the opening into the discharge channel 7, which is provided inside the partition 4 and extends upwardly to connect with the discharge opening 3.

For the purpose of drawing off the water or other ingredients which have been excluded from passage through the screens 8 and 9, the lower end of the chamber 1 is provided with a suitable outlet, which is preferably controlled by a cock 11, which discharges downwardly from the bottom of the chamber 1. By reference to Figs. 1 and 2 it will be seen that the inlet and outlet openings 2 and 3 are arranged co-axially at the top of the filter chamber 1, thus adapting the separator to be attached to a faucet or nozzle without removing the discharge point of the gasolene very far from the point at which it would discharge were the separator not in use. With reference to the constructional features of this embodiment of my invention, the device will be seen to comprise a top cap or casting 12 having the inlet and outlet openings provided therein, the bottom cap 13 having a discharge opening therein, and a cylinder forming the wall of the chamber 1. Within the top cap 12 is provided a perforation while in a lug 14 formed integral on the bottom cap 13 is a threaded socket 15, said perforation and socket being co-axially alined to receive a central rod 16 threaded on both ends. Said rod projects through the perforation in the upper cap and is provided with a nut 17 for securing the parts rigidly together. Extending about the lower end of the rod 16 is a ring or projection 18 which engages the lower end of the screen 8 and acts as a support therefor. The inner screen 9 is rigidly enforced by a plurality of ribs preferably in the form of wires 19, while at the same time the screens 8 and 9 are rigidly connected together by means of the supporting strips 20.

What I claim is—

1. In a separator, the combination of a chamber provided with means for introducing a mixture thereinto with a whirling movement, of a discharge passage arranged along the axis of said chamber, and a frusto-conical filter screen encircling the opening into and depending from the walls of the discharge passage.

2. In a separator, the combination with a separator chamber provided with an inlet channel extending around its inner wall and a discharge channel extending along the axis of said chamber inside of the inlet channel, of a filter sheet about and depending from the opening of said discharge channel in the form of an inverted conical frustum.

3. In a separator, the combination with a cylindrical separator vessel provided with a cylindrical partition wall extending a portion of the length of said vessel, said partition being adapted to provide an inlet channel extending around the inner wall of the vessel and a discharge passage extending along the axis of said vessel, of a filter screen depending from the end of said partition converging toward the end of the screen and providing a screening surface in excess of the area of the discharge passage.

4. In a separator, the combination with a cylindrical vessel mounted upon a vertical axis and provided with a cylindrical partition wall at the upper end thereof, said partition wall being adapted to provide an inlet channel extending around and the inner wall of the vessel, and a discharge passage extending upwardly through said vessel, of a filter screen depending from said partition to provide an enlarged screening surface for the end of the discharge passage.

5. In a separator, a cylindrical vessel provided with an inner cylindrical partition wall at one end, and a plurality of filter screens depending from the end of said partition concentrically with the axis of said vessel, said vessel being provided with a discharge passage formed with said cylindrical partition and said filter screens providing a screening shield for the discharge passage.

6. A separator comprising a vertically arranged cylindrical chamber provided with a partition forming a helical inlet passage and a discharge passage at the upper end, an inclosing filter screen depending from the lower end of said partition and extending around the opening into said discharge passage, and a second discharge opening at the lower end of the chamber.

7. In a separator, a cylindrical vessel provided with an inner cylindrical partition wall extending for a portion of the length thereof, a helical partition interposed between the outer wall and said inner partition, a frusto-conical screen secured about the periphery of its larger diameter around the lower edge of said cylindrical partition wall and having its lower end depending into said cylindrical vessel, and a discharge outlet leading from the upper end of the space within said inner partition wall.

8. In a separator, the combination of a cylindrical outer vessel provided with an inlet, an inner discharge passage disposed within the vessel, means to impart a whirling movement to an entering fluid mixture, and a screen impervious to one of the liquids disposed about the discharge entrance within the vessel.

9. In a separator, the combination of a separator chamber provided with an inlet channel disposed about its inner wall whereby a whirling movement is imparted to a fluid mixture, a discharge channel extending along the axis of the said chamber and a plurality of screens concentrically disposed about the opening of the discharge channel within the said chamber, the said screens being pervious to the passage of one liquid to the discharge channel and impervious to the other liquid or liquids.

10. In a separator for gasolene and water, the combination of a separator chamber with an inlet, an inner discharge passage disposed within the chamber, means to impart a whirling motion to an entering fluid mixture, a screen disposed within the chamber and depending from the opening of the discharge passage, said screen being impervious to the passage of water therethrough and permitting the passage of the gasolene therethrough.

In testimony whereof I have signed my name to this specification, in the presence of two subscribing witnesses, on this 23rd day of August A. D. 1909.

ALLEN A. BOWSER.

Witnesses:
H. W. BROWN,
E. J. LITTLE.